United States Patent Office 3,442,835
Patented May 6, 1969

3,442,835
WATER-DISPERSIBLE POLYALKYLENE GLYCOL MODIFIED DRYING OIL ALKYD
Gerald M. Curtice, Burnsville, and David D. Taft, Minneapolis, Minn., assignors, by mesne assignments, to Ashland Oil and Refining Company, a corporation of Kentucky
No Drawing. Filed Aug. 19, 1965, Ser. No. 481,119
Int. Cl. C08g 17/16, 53/18, 17/14
U.S. Cl. 260—22                                           3 Claims

ABSTRACT OF THE DISCLOSURE

A water-dispersible drying oil alkyd resin modified with polyalkylene glycol and having the following ingredients:

|  | Percent by wt. |
|---|---|
| Drying oil | 20–45 |
| Polyhydric alcohol of 2–6 hydroxyl groups | 15–40 |
| Polyoxyethylene glycol (molecular wt. 600–6000) | 5–15 |
| Non-oxidizing monobasic carboxylic acid of 6–18 carbon atoms | 10–25 |
| Dicarboxylic acid or anhydride of 4–10 carbon atoms | 20–35 |

Process for preparing the foregoing composition in which the drying oil, the polyoxyethylene glycol, the non-oxidizing monobasic carboxylic acid, and 40–100% of the polyhydric alcohol are mixed and heated in the first step to obtain an acid value of 0–25; and in the second step the remainder of the polyhydric alcohol and all of the dicarboxylic acid or anhydride are added to the mixture and heated until the acid value is 5–25; and the resulting mixture neutralized and dispersed in water. The product of this invention is a water-dispersible resin well suited to form water-based paints or other coating compositions having an excellent stability and resistance to hydrolysis.

---

This invention relates to a novel water-dispersible polyalkylene glycol modified drying oil alkyd. In another aspect, it relates to a process for preparing a water-dispersible alkyd resin. In another aspect, it relates to alkyd resins which have an improved stability in the dispersed state and are useful in the production of water-based paint.

Water-based paints are becoming increasingly popular as compared to organic solvent-based paints because of the many advantages which the water-based paints have to offer. These advantages include the reduction in fire hazard, reduction in odors, absence of expensive solvent, and the convenience of using water to thin the paint as well as to clean the utensils employed in the painting operation. Because alkyd resins are inherently hydrophobic, one of the chief difficulties in preparing water-based modified alkyd resin paints has been to prepare an alkyd resin which can be dispersed in water without external dispersing aids and which will remain in that dispersed condition with a reasonable degree of stability.

The alkyd resin of this invention is readily dispersed in water after residual acidity of the resin is partially or completely neutralized. This alkyd resin exhibits improved properties when dispersed in a continuous aqueous phase in that the dispersed alkyd resin has an improved resistance to hydrolysis. If hydrolysis does occur, it causes an undesirable decrease in the viscosity and in the pH of the resin. Furthermore, it is not necessary to provide a protective colloid or other additive to assist in maintaining the dispersion of this alkyd resin. This alkyd resin exhibits excellent mechanical and freeze-thaw stability in that the dispersed resin is readily combined with common pigments. In addition, the final paint exhibits excellent freeze-thaw stability.

It is an object of this invention to provide a novel alkyd resin. It is another object of this invention to provide a process for preparing the novel water-dispersible alkyd resin of this invention. It is still another object of this invention to provide an aqueous dispersion of an alkyd resin in which the resin has an improved resistance to hydrolysis. Still other objects will appear from the more detailed description of this invention which follows.

The foregoing objects are accomplished in accordance with this invention by providing an alkyd resin which consists essentially of the following ingredients on a weight basis:

|  | Percent |
|---|---|
| Drying oil (or precursors thereof, i.e., fatty acid and triol) | 20–45 |
| Polyhydric alcohol containing 2–6 hydroxyl groups/molecule | 15–40 |
| Polyoxyethylene glycols having a molecular weight from 600 to 6000 | 5–15 |
| Non-oxidizing, monobasic carboxylic acid, having 6–18 carbon atoms per molecule | 10–25 |
| Dicarboxylic acid or anhydride having 4 to 10 carbon atoms per molecule | 20–35 |

Insofar as the process of this invention is concerned, the foregoing objects are accomplished by providing, according to one aspect, a stepwise process for making the alkyd resin, in which process a portion of the foregoing ingredients are treated in a first step, and the remaining ingredients are added in one or more succeeding steps in the process. For example, the drying oil, the polyoxyethylene glycol, the non-oxidizing monobasic carboxylic acid, and 40 to 100 weight percent of the polyhydric alcohol are mixed and heated at the temperature of about 350° to 550° F., preferably 460° to 480° F., e.g., for an hour or longer, until the mixture has an acid value of 0 to 25 and preferably 0 to 15. The remainder of the polyhydric alcohol and all of the dicarboxylic acid or its anhydride are then added and the resulting mixture is heated at 350° to 550° F., preferably 400° to 480° F., e.g., for an hour or longer, until the acid value is 5 to 25 and preferably 9 to 15. In another aspect, the alkyd resin is made in a one-step process according to which all the above-listed ingredients are charged and heated together at 350° to 550° F., preferably 400° to 480° F., until the mixture has an acid value of 5 to 25, preferably 9 to 15. Where the drying oil component is a natural glyceride oil, the stepwise process is preferred. Where the drying oil component is actually to be formed in situ by charging the precursors thereof (i.e., fatty acid and triol), the one-step process is preferred. In any case, the alkyd resin formed product is then neutralized and dispersed at any desired viscosity in water to give the improved product of this invention.

If one were to make an alkyd resin from the ingredients listed above by employing the prior art or conventional alcoholysis procedure (according to which the polyhydric alcohol and drying oil would be reacted in a first step and the resulting alcoholysis product would then be reacted in a second step with further polyhydric alcohol, carboxylic acid or anhydride, and polyoxyethylene glycol), the resulting alkyd resin when neutralized would exhibit poor mechanical, freeze-thaw, and storage stabilities. Contrariwise, by reacting the above-listed resin-forming ingredients according to the stepwise or one-step processes of the invention, the resulting dispersions of the neutralized alkyd resins exhibit superior stability, as discussed above and as will be demonstrated hereafter.

The drying oils which are employed in this invention include any of the natural glyceride oils normally employed in the manufacture of alkyd resins. The term "drying oil" is used herein as meaning unsaturated triglycerides of fatty acids generally having 10 to 24 carbon atoms per molecule and as inclusive of what are known in the art as semi-drying and drying oils. Suitable drying oils which can be used for this purpose representatively include vegetable oils such as cottonseed oil, corn oil, soybean oil, safflower oil, tung oil, sunflower oil, oiticica oil, rapeseed oil, linseed oil, perilla oil, poppyseed oil, tall oil, dehydrated castor oil, blown castor oil, etc., and fish oils such as herring oil, menhaden oil, codfish oil, whale oil, and the like, including mixtures thereof. The preferred oil for reasons of convenience in supply and because of the quality provided to the final product is safflower oil or soybean oil. The amount of the oil which is employed in this invention can vary from about 20% to about 45% by weight of the final product, but preferably it is present in the range of about 25–35%. The term "drying oil" also includes the esters of unsaturated fatty acids having 10 to 24 carbon atoms and such triols as trimethylol ethane, trimethylol propane, and the like, where the mole ratio of fatty acid-to-triol is 3:1. It should be understood that it is within the scope of this invention to charge the drying oil as such or to charge its fatty acid and triol (including glycerine) ester-forming precursors and form the ester in situ. Also, the drying oil component can comprise a mixture of various drying oils.

The polyhydric alcohol which is employed as an ingredient in making the drying oil-modified alkyd resin of this invention is one which contains at least two but not more than six hydroxyl groups in a molecule and has from two to eight carbon atoms. Typical examples of such a polyhydric alcohol include ethylene glycol, diethylene glycol, glycerine, trimethylol ethane, trimethylol propane, pentaerythritol, dipentaerythritol, sorbitol, manitol, and similar polyhydric alcohols which can be employed in the preparation of alkyd resins. Mixtures of these polyhydric alcohols can be used. Pentaerythritol is preferred because it not only enhances the drying properties of the dispersion of the neutralized resin but also when used will enable the dispersion to have a high non-volatile content and yet a desirable, workable viscosity, and paints made from such dispersion will have a desirable working consistency.

In the process of this invention, if the drying oil component used is a natural triglyceride, the polyhydric alcohol is preferably split into two portions for use in two separate steps of the process. The overall amount which is employed in the process varies from about 15% to about 40% by weight of the final product. Preferably, in the first step of the process approximately 60% of the total polyhydric alcohol is employed. This conveniently runs from about 10 to 20% by weight of the final product, and in the second step the remainder of the polyhydric alcohol is employed, namely from about 5 to 25% by weight of the final product.

The polyoxyethylene glycol which is employed in this invention is a compound having a long chain of repeating oxyethylene groups and a hydroxyl group at each end of the chain. This material may also be called a polyethylene glycol or a polyether glycol. In order for this material to be of the proper consistency to be employed in the process of this invention, it should have an average molecular weight which is from about 600 to about 6000. (This molecular weight is determined by the use of a phthalic anhydridepyridine reagent as described in "Carbowax" Polyethylene Glycols, published by Union Carbide Co., p. 50, (1958). The amount of polyoxyethylene glycol which is employed in this invention is from about 5% to about 15% by weight of the total final product.

The non-oxidizing, monobasic carboxylic acid which is employed in this invention is one which has from about 6 to about 18 carbon atoms per molecule, and is intended to include the saturated aliphatic acids, the saturated cycloaliphatic acids, and the aromatic acids. Typical examples of the types of acids included are isodecanoic, isooctanoic, cyclohexanoic, cyclopentanoic, benzoic, p-tertiary butyl benzoic acids, and the long chain fatty acids derived from materials such as cocoanut oils, palm kernal oil, babassu oil, and others known to those skilled in the art. Mixtures of these acids can also be used. The preferred materials for this component of the invention are benzoic acid and p-tertiary butyl benzoic acid. The amount of these acids which is employed in the process of this invention is from about 10% to about 25% by weight of the total final product. The non-oxidizing, monobasic carboxylic acid is an essential resin-forming component in this invention and it contributes to the hardness of the cured alkyd resin, thus the tack-free time of the films of the resin is shorter.

The dicarboxylic acid or anhydride which is employed in this invention has 4 to 10 carbon atoms per molecule and includes the aliphatic, cycloaliphatic, and aromatic dicarboxylic acids, and their anhydrides. Specific compounds which are included in this group of materials are terephthalic, isophthalic, adipic, glutaric, azelaic, and phthalic acids and anhydrides. The amount of these materials which is employed in the process of this invention varies from about 20% to about 35% by weight of the final product.

It is particularly preferred in this invention to employ isophthalic acid as the dicarboxylic acid or anhydride. The resins which are made employing isophthalic acid have a much greater resistance in the dispersed phase to hydrolytic cleavage than do resins made with the corresponding phthalic derivatives. Thus, alkyd resins of this type can be dispersed in water and made into water-based paints or other water-dispersed compositions which will not exhibit as great a decrease in viscosity or a lowering in pH over periods of storage time.

In the preparation of the alkyd resins of this invention, during the reaction of the resin-forming ingredients, a nitrogen blanket can be used where an alkyd resin of good color is desired. Also, during such reaction, an azeotropic solvent can be used to facilitate removal of by-product water. This use of solvent is conventional in alkyd preparations, the typical solvent used being xylene. Where residual amounts of such solvent hinder the subsequent water dispersability of the resin, water miscible, inert solvents can be used instead. Typical of the water-miscible solvents which can be used for this purpose are various ethers and ether esters of ethylene glycol and diethylene glycol, such as Cellosolve acetate, diethyl Carbitol, dibutyl Carbitol, methyl Cellosolve acetate, Carbitol acetate, butyl Cellosolve acetate, and the like. In order to facilitate the esterification and transesterification reactions in the first step of the two-step process or in the one-step process, suitable alcoholysis catalysts can be used, such as cobalt naphthenates, litharge, and the like, and preferably lithium hydroxide.

The neutralization of the alkyd resin can be accomplished by adding a small amount of a neutralized agent to neutralize a portion or all of the remaining acid groups in the resin. Generally, the amount of neutralizing agent used will be that sufficient to neutralize 20 to 150%, preferably 50 to 90%, of the theoretical acid groups in the resin. The resin is then dispersed at any desired viscosity in water to provide a water dispersion containing 5 to 55 weight percent resin solids (non-volatile), which can then be transformed in an otherwise conventional manner into a water-based paint or other similar composition by the addition of suitable emulsifiable driers, e.g., manganese or cobalt, and pigments, e.g., zinc oxide, titanium dioxide, calcium carbonate, and the like.

Useful neutralizing agents which can be used include ammonia, ammonium hydroxide, and primary, secondary and tertiary mono- or polyamines, including hydroxyamines, and especially the lower alkylamines, such as ethylamine, butylamine, dimethyl amine, diethyl amine, tributyl amine, triethyl amine, triisopropanolamine, ethanolamine, dimethylethanolamine, butanolamine, and the like. Amines which are volatile at temperatures below 350° F., preferably 250° F., are preferred. The amines can be added in undiluted form to give essentially anhydrous neutralized resin products, which products will be capable of practically unlimited dilution or dispersion in water without being coagulated. Alternatively, the resins can be neutralized by adding them to dilute aqueous solutions of water dispersible amines. Inorganic neutralizing agents, such as potassium or sodium hydroxide or carbonates can also be used. Mixtures of neutralizing agents can also be used.

In the preferred embodiment of the stepwise resin forming process, the first step of the reaction is accomplished by mixing safflower oil, pentaerythritol, a polyoxyethylene glycol such as "Carbowax 4000" having a molecular weight of about 2700 to 3200, and benzoic acid or p-tertiary-butyl benzoic acid. The amount of safflower oil is 20 to 30% of the total weight of material added in the process. These materials are reacted under a nitrogen blanket at atmospheric pressure and a temperature of 460° to 480° F. until the acid value of the material reaches a level of 0 to 25. This product is then esterified further by the addition of the remaining pentaerythritol and isophthalic acid (which optionally can be a mixture of isophthalic acid and phthalic anhydride), and heating the mixture under nitrogen at a temperature of 420° to 480° F. and at atmospheric pressure until the product has an acid value of 9 to 15. The material is then neutralized at 180° to 200° F. with triethylamine in an amount sufficient to neutralize 60 to 100%, preferably 80 to 90%, of the theoretical remaining acid groups in the product (based on the charge). This partially neutralized resin is then dispersed in water at about 130° to 180° F., preferably 140° to 150° F., to produce a water-dispersed resin having a high degree of resistance to hydrolysis.

The water dispersed resins of this invention can be used to form finishes or coatings which are air-drying in nature. Such air-dried finishes have excellent adhesion to the substrate to which they are applied, as well as good flexibility, good gloss, and toughness. Alternatively, the water dispersions of this invention can have conventional aminoplasts incorporated therein, such as urea-formaldehyde resins and methylolated triazine resins, and used to form baking finishes, for example, at 200 to 350° F., preferably about 250° F., for 5 to 30 minutes, preferably 10 minutes. The baked finishes will be free from surface defects and will exhibit a high degree of flexibility.

In the following examples, the invention may be more fully understood. Parts and percentages are by weight and temperatures are in degrees Fahrenheit unless otherwise indicated. It is not intended that these examples shall limit the invention in any way whatsoever since they are intended merely to be illustrative of certain embodiments of this invention.

Example I

An alkyd resin was prepared from the following ingredients:

| | Parts by wt. |
|---|---|
| Safflower oil | 564 |
| Pentaerythritol | 166 |
| p-Tertiary-butyl benzoic acid | 402 |
| Polyoxyethylene glycol (M.W.=3000–3700) | 192 |
| Phthalic anhydride | 585 |
| Pentaerythritol | 332 |

The first four ingredients above were charged into a flask which was fitted with a thermometer, a mechanical agitator, and a water trap to which was attached a reflux condenser. The temperature was raised to 460° F. and maintained at that level until an acid value of 30 was obtained by testing the mixture. The resin was cooled and the last two ingredients were added. The reaction was then heated to 430° F. until an acid value of 15 was obtained. The resin was then dispersed in an aqueous solution of diethylamine, yielding a white, opalescent dispersion having a viscosity of 12,000 cps., a pH of 8.0, and a non-volatile content of 39%. A clear film 3 mils in thickness was cast and allowed to dry overnight in the presence of an emulsifiable cobalt drier (in the amount of 0.1%). After 16 hours the film exhibited a Sward hardness of 8 which increased to 16 after 48 hours. The film was clear with no surface imperfections, glossy, flexible, and exhibited good resistance to caustic (5% concentration).

Example II

An alkyd resin was prepared from the following ingredients:

| | Parts by wt. |
|---|---|
| Safflower oil | 250 |
| Pentaerythritol | 80 |
| Benzoic acid | 91 |
| Polyoxyethylene glycol (M.W.=3000–3700) | 70 |
| Isophthalic acid | 228 |
| Pentaerythritol | 108 |

The same resin-forming procedure as described above with respect to Example I was followed with the exception that an acid value of 10 was obtained at the end of the first step, and an acid value of 10 was obtained at the end of the second step. The resin product was neutralized with triethylamine and then dispersed in water. A low viscosity dispersion resulted from which was cast a clear film 3 mils in thickness, which film exhibited a Sward hardness of 6 after 48 hours of drying.

Example III

An alkyd resin was prepared from the following ingredients:

| | Parts by wt. |
|---|---|
| Safflower oil | 250 |
| Pentaerythritol | 80 |
| p-Tertiary-butyl benzoic acid | 134 |
| Polyoxyethylene glycol (M.W.=1450) | 64 |
| Pentaerythritol | 220 |
| Isophthalic acid | 96 |

The same resin-forming procedure as described with respect to Example I was followed. The acid value was 11 at the end of the first step and 9 at the end of the second step. After neutralization and dispersion as in Example II, an opalescent dispersion was obtained which had a viscosity of 1260 cps., a pH of 7.7, and a non-volatile content of 40%. A film was cast 3 mils in thickness in the presence of 0.1% of a cobalt drier, and allowed to dry overnight to a clear film having a Sward hardness of 6.

Example IV

An alkyd resin was prepared from the following ingredients:

| | Parts by wt. |
|---|---|
| Safflower oil | 440 |
| p-Tertiary-butyl benzoic acid | 178 |
| Pentaerythritol | 137 |
| Polyoxyethylene glycol (M.W.=1450) | 145 |
| Isophthalic acid | 336 |
| Trimethylol ethane | 148 |

The same resin-forming procedure as described with respect to Example I was followed. An acid value of 16 was obtained at the end of the first step and 9.6 at the end of the second step. The resin was neutralized and dispersed as in Example II to produce an opalescent dispersion having a viscosity of 1130 cps., a pH of 7.4, and a non-volatile content of 40%. A cast film 3 mils in thickness was clear and glossy.

Example V

A series of alkyd resins was prepared comparing various process modifications and employing various combinations of the following ingredients:

| | Parts by wt. |
|---|---|
| Safflower oil | 310.17 |
| Pentaerythritol | 99.26 |
| p-Tertiary-butyl benzoic acid | 166.25 |
| Polyoxyethylene glycol (M.W.=2700–3200) | 86.84 |
| Carbitol acetate | 12.41 |
| Diethyl carbitol | 6.20 |
| Lithium hydroxide | 0.12 |
| Isophthalic acid | 282.88 |
| Pentaerythritol | 133.37 |

In each instance the general processing steps described above with respect to Example I were followed with modifications as indicated below. All of the resins were neutralized with triethyl amine prior to dispersion in water.

In Process A the polyoxyethylene glycol was added in the second step.

In Process B the lithium hydroxide was omitted.

In Process C the solvents, carbitol acetate and diethyl carbitol, were omitted.

In Process D the resin was prepared according to Example I.

In Process E all ingredients were added at one time and the process reduced to a single step.

In Process F isophthalic acid was replaced entirely by phthalic anhydride.

| Process | Acid value 1st step | Acid value 2nd step | Base resin viscosity (stokes) | Dispersion Viscosity (cps) | Dispersion Nonvolatiles, wt. percent | pH |
|---|---|---|---|---|---|---|
| A | 15.0 | 8.6 | 26.0 | 920 | 40.6 | 7.5 |
| B | 15.6 | 10.1 | 25.7 | 1,570 | 40.6 | 7.3 |
| C | 15.7 | 10.1 | 51.0 | 3,760 | 39.0 | 7.0 |
| D | 16.3 | 9.4 | 26.2 | 1,860 | 44.2 | 7.2 |
| E | | 9.0 | 23.2 | 1,928 | 41.4 | 7.5 |
| F | | 14.0 | 15.6 | 1,300 | 41.8 | 6.7 |

Clear wet films (0.0015″ thick) of the above six dispersions (containing 0.1 wt. % cobalt emulsifiable drier) cured overnight to tack-free glossy films.

Example VI

Two water-dispersible resins were prepared employing the ingredients described in Example V and the resins were tested as that described above as Process F using phthalic anhydride and the other resin was the same as that described above as Process D using isophthalic acid. The dispersions in each case were tested to determine their viscosities and pH values, set aside for a week at 120° F. then tested for viscosity and pH, st aside for another week and tested again, and so on, through a period of four weeks. The following results were obtained, which show that the dispersion made from the resin using isophthalic acid had superior hydrolytic stability, as evidenced by significantly lower decreases in viscosity and pH upon standing.

| Time of measurement (at 120° F.) | Dispersion from resin prepared with phthalic anhydride Viscosity (cps.) | pH | Acid value | Dispersion from resin prepared with isophthalic acid Viscosity (cps.) | pH | Acid value |
|---|---|---|---|---|---|---|
| Immediately after prep | 1,300 | 6.7 | 14.0 | 1,460 | 7.1 | 11.3 |
| One week later | 600 | 6.5 | 14.7 | 1,040 | 6.9 | 12.8 |
| Two weeks later | | | | 894 | 6.73 | 13.0 |
| Three weeks later | 170 | 5.7 | 19.9 | | | |
| Four weeks later | | | | 904 | 6.63 | 13.7 |

Example VII

And alkyd resin was prepared from the following ingredients:

| | Parts by wt. |
|---|---|
| Safflower oil | 705 |
| p-Tertiary butyl benzoic acid | 71 |
| Pentaerythritol | 170 |
| Polyoxyethylene glycol (M.W.=2700–3200) | 260 |
| Pentaerythritol | 85 |
| Phthalic anhydride | 316 |

The resin was prepared as described in Example I. An acid value of 18 was reached at the end of the first step and 13 at the end of the second step. The resin was neutralized and dispersed as in Example II. An opalescent dispersion was obtained having a viscosity of 12,400 cps. at a pH of 7.5.

Example VIII

A series of alkyd resins was prepared comprising various modifications and employing the following ingredients:

| | Parts by wt. |
|---|---|
| Safflower oil | 261 |
| Pentaerythritol | 154 |
| p-Tertiary butyl benzoic acid | 186 |
| Polyoxyethylene glycol (M.W.=2700–3200) | 89 |
| Isophthalic acid | 74 |
| Phthalic anhydride | 206 |
| Pentaerythritol | 90 |

In each instance the general processing steps described above with respect to Example I were followed with modifications as indicated below. In addition, the resins were neutralized and dispersed as in Example II.

In Process A the resin was prepared just as described in Example I.

In Process B all the pentaerythritol was included in the first step.

In Process C the para-tertiary butyl benzoic acid was replaced on a molar basis by benzoic acid.

In Process D soyabean oil replaced safflower oil.

In Process E soyabean oil replaced safflower oil and para-tertiary butyl benzoic acid was replaced by an equal weight of benzoic acid.

In Process F a conventional alcoholysis process was followed. All of the pentaerythritol was charged initially.

In Process G the safflower oil was replaced by safflower fatty acids and trimethylol ethane. A one-step process was utilized.

In Process H all isophthalic acid was used in place of phthalic anhydride.

| Process | Acid value 1st step | Acid value 2nd step | Base resin viscosity (stokes) | Dispersion Viscosity (c.p.s.) | Dispersion Nonvolatiles, wt. percent | pH |
|---|---|---|---|---|---|---|
| A | 1.8 | 13.4 | 20.4 | 4,000 | 42.6 | 6.7 |
| B | 11.9 | 13.6 | 15.0 | 3,500 | 42.2 | 7.2 |
| C | 1.0 | 12.8 | 35.0 | 2,800 | 42.5 | 6.7 |
| D | 2.0 | 14.1 | 18.8 | 6,750 | 42.6 | 7.2 |
| E | 2.1 | 14.5 | 14.8 | 1,960 | 44.0 | 7.1 |
| F | | 15.1 | 16.8 | (1) | 39.0 | 7.4 |
| G | | 13.7 | 12.0 | 3,360 | 43.6 | 7.4 |
| H | 15.6 | 7.4 | 62.4 | 1,600 | 41.2 | 7.4 |

1 Solid paste.

All of the dispersions described above, with the exception of that containing the resin prepared by Process F, have properties which make them suitable for use in the formulation of drying paint vehicles. The dispersion containing the resin prepared by Process F, on the other hand, because of its paste-like appearance and undesirable viscosity, would not be suitable for such use.

Various modifications and alterations of this invention will become apparent to those skilled in the art without departing from the scope and spirit of this invention, and it should be understood that this invention is not to be limited to the preferred embodiments set forth herein for illustrative purposes.

What is claimed is:

1. A process for preparing a water-dispersible polyalkylene glycol modified drying oil alkyd resin consisting essentially of the following ingredients and their proportions by weight:

| | Percent |
|---|---|
| Glyceride or ester drying oil | 20–45 |
| Polyhydric alcohol containing 2–6 hydroxyl groups/molecule | 15–40 |
| Polyoxyethylene glycol having a molecular weight from 600 to 6000 | 5–15 |
| Non-oxidizing, monobasic carboxylic acid having 6 to 18 carbon atoms/molecule | 10–25 |
| Dicarboxylic acid or anhydride having 4 to 10 carbon atoms per molecule | 20–35 | in which said drying oil, said polyoxyethylene glycol, said non-oxidizing monobasic carboxylic acid and approximately one-third of said polyhydric alcohol are heated at 350° to 550° F. in a first processing step until the mixture reaches an acid value of 0 to 25, cooling said mixture and adding the remaining polyhydric alcohol and the dicarboxylic acid or anhydride, and heating the resulting mixture in a second processing step at 350° to 550° F. until the mixture reaches an acid value of 5 to 25, and thereafter neutralizing and dispersing the material in an aqueous medium.

2. A process for preparing a water-dispersible polyalkylene glycol modified drying oil alkyd resin having the following ingredients and their proportions by weight:

| | Percent |
|---|---|
| Safflower oil | 25–35 |
| Pentaerythritol | 15–30 |
| Polyoxyethylene glycol (M.W.=2700–3200) | 6–12 |
| Benzoic acid | 10–20 |
| Isophthalic acid | 20–30 | which process comprises heating the safflower oil, the polyoxyethylene glycol, the benzoic acid, and about 40% of the pentaerythritol at a temperature of about 480° F. until the mixture exhibits an acid value of 0 to 15, cooling the mixture to room temperature, adding the remainder of the pentaerythritol and the isophthalic acid, heating the resulting mixture at a temperature of about 460° to 480° F., until the mixture exhibits an acid value of 9 to 15, neutralizing 80% to 90% of the remaining acid groups by dispersing the mixture in an aqueous solution of triethylamine, and dispersing the resulting partially neutralized alkyd resin in water at a temperature of 130° to 180° F.

3. A process for preparing a water-dispersible polyalkylene glycol modified drying oil alkyd resin having the following ingredients and their proportions by weight:

| | Percent |
|---|---|
| Safflower oil | 20–30 |
| Pentaerythritol | 18–28 |
| Polyoxyethylene glycol (M.W.=2700–3200) | 5–15 |
| Benzoic acid | 15–25 |
| Isophthalic acid | 5–20 |
| Phthalic anhydride | 15–25 | which process comprises heating the safflower oil, the polyoxyethylene glycol, the benzoic acid, and about two-thirds of the pentaerythritol at a temperature of about 470° to 480° F. until the mixture exhibits an acid value of 0 to 6, cooling the mixture below 300° F., adding the remainder of the pentaerythritol, the isophthalic acid, and the phthalic anhydride, heating the resulting mixture at a temperature of about 420° to 480° F. until the mixture exhibits an acid value of 9 to 15, neutralizing 80% to 90% of the remaining acid groups by dispersing the mixture in an aqueous solution of triethylamine or by dispersing the partially neutralized alkyd resin in water at a temperature of 130° to 180° F.

References Cited
UNITED STATES PATENTS

| | | | |
|---|---|---|---|
| 2,634,245 | 4/1953 | Arndt | 260—22 |
| 3,001,961 | 9/1961 | Armitage et al. | 260—22 |
| 3,077,459 | 2/1963 | Hershey et al. | 260—22 |
| 3,223,659 | 12/1965 | Curtice et al. | 260—22 |
| 3,297,605 | 1/1967 | Schroeder et al. | 260—22 |
| 3,329,634 | 7/1967 | McWhorter et al. | 260—22 |
| 3,310,512 | 3/1967 | Curtice | 260—29.2 |
| 3,379,548 | 4/1968 | Jen | 260—22 |

HOSEA E. TAYLOR, JR., *Primary Examiner.*

R. W. GRIFFIN, *Assistant Examiner.*

U.S. Cl. X.R.

260—21, 29.2, 30.6, 32.4, 32.6; 117—167